United States Patent [19]

Gagliani et al.

[11] Patent Number: 4,599,365
[45] Date of Patent: Jul. 8, 1986

[54] FOAMING AND CURING POLYIMIDE RESINS BY APPLICATION OF MICROWAVE ENERGY

[76] Inventors: John Gagliani, 6280 Lance Pl., San Diego, Calif. 92120; John V. Long, 1756 E. Lexington Pl., El Cajon, Calif. 92021

[21] Appl. No.: 799,614

[22] Filed: Nov. 19, 1985

Related U.S. Application Data

[63] Continuation-in-part of Ser. No. 565,574, Dec. 27, 1983.

[51] Int. Cl.$^4$ .............................. C08J 9/22; C08J 9/24
[52] U.S. Cl. ........................................ 521/56; 521/180; 521/183; 521/184; 521/185; 521/189; 528/184; 528/322; 528/323; 528/328
[58] Field of Search ................. 521/56, 180, 183, 184, 521/185, 189; 528/184, 322, 323, 328

[56] References Cited

U.S. PATENT DOCUMENTS

Re. 31,756 12/1984 Gagliani et al. ..................... 521/56

*Primary Examiner*—Morton Foelak
*Attorney, Agent, or Firm*—Frank D. Gilliam

[57] ABSTRACT

Methods of foaming and fully curing polyimide resins entirely by the application of microwave energy. Foamable polyimide resins may be prepared by esterifying a suitable dianhydride, reacting the product with a suitable diamine, drying the resulting product and heating to spontaneously form a foam. In the past, such materials could be foamed but could not be satisfactorily cured to a resilient foam entirely by microwave energy. Post-foaming direct application of thermal energy was required to produce a satisfactory foam. We have found that adding a suitable oxoimine, such as caprolactam, to the reaction mixture results in a foam material which is fully and completely cured entirely by the application of microwave energy, considerably simplifying the process and reducing costs.

20 Claims, No Drawings

FOAMING AND CURING POLYIMIDE RESINS BY APPLICATION OF MICROWAVE ENERGY

CROSS-REFERENCE TO RELATED U.S. PATENT DOCUMENTS

This application is a continuation-in-part of U.S. patent application Ser. No. 565,574, filed Dec. 27, 1983.

BACKGROUND OF THE INVENTION

This invention relates in general to polyimide resin foam materials, and, more specifically, to compositions and methods for foaming and fully curing polyimide resins entirely by the application of microwave energy to produce resilient, flame resistant foams.

Prior U.S. Pat. Nos. 4,161,477, 4,183,838 and 4,183,839 disclosed and claimed certain polyimide compositions which are flame resistant and useful as coatings and adhesives.

The coating and adhesive compositions described in the above-mentioned prior patents are made by first preparing a suitable bisimide by reacting an aromatic tetracarboxylic acid dianhydride with a cyclic amide or oxoimine. The ratio of oxoimine to dianhydride is preferably in the 2.3:1 to 2.7:1 range and the imidization reaction is preferably conducted at a temperature of 170°–200° C. for 20–60 minutes.

The polyimide forming material is then prepared by dissolving the bisimides in an inert solvent; then adding thereto a suitable diamine, producing a viscous fluid containing an intimate, unpolymerized mixture of N-substituted cyclic bisimide dicarboxylic acid and diamine which is capable of being converted to a high molecular weight polymer by the application of heat.

The solution is coated onto a surface and polymerized by heating to a temperature in the 177°–316° C. range for 30 minutes to 5 hours. The following is exemplary of the exchange reaction which occurs:

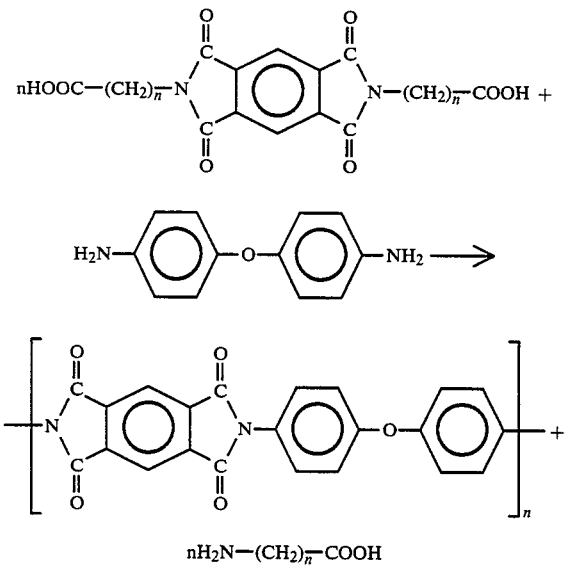

where n is a positive integer.

The resulting coating is tough, highly adherent to various surfaces, with very few pinholes or bubbles. It has excellent peel strength and is resistant to high temperatures, peeling and abrasion.

The prior coating material, however, was not suitable for use in applications requiring a cellular or foam material, since conventional agitation foaming and addition of known blowing agents add to process costs and complexity and are not entirely effective at the relatively high polymerization temperature required.

A number of other methods and compositions have been described for the production of foams from polyimide resins, either spontaneously upon heating or by the inclusion of a foaming agent. Typical are those detailed in U.S. Pat. Nos. 3,554,939, 4,296,208, 4,315,077, 4,394,464, 4,369,261 and 4,335,120. The methods described in these patents produce good foams, but use complex, energy inefficient, heating and foaming methods and do not contemplate the use of microwave energy to accomplish foaming and curing. Another U.S. Pat., No. 4,305,796, does discuss using microwave energy to cause a polyimide resin to foam and partially cure. As pointed out in that patent, to achieve best cure, the resin should either be thermally preheated, or the microwave cavity should be thermally heated during microwave energy application. As is detailed below, the method used in this patent does not produce a fully acceptable cure by application of only microwave energy.

Thus, there is a continuing need for improved compositions and methods for producing improved polyimide foams, especially for the foaming and curing of polyimide foams by only the application of microwave energy for improved process simplicity and energy efficiency.

SUMMARY OF THE INVENTION

We have now found that, by suitably varying reaction conditions and certain ingredients, within specified limits, materials similar to those described above and in the cited prior patents can be used to produce a resilient, flame resistant, modified polyimide cellular structure. For the purposes of this application, "modified polyimide" will be used to mean a mixture of polyimide and polyimide-amide resins varying from almost entirely polyimide to almost entirely polyimide-amide.

The basic steps in producing and curing our improved resilient foam are reacting a suitable oxoimine with a suitable dianhydride in a ratio of oxoimine to dianhydride of from about 1.5:1 to 0.05:1 to produce a monoimide, dissolving this mixture in a reactive solvent which is an esterifying agent to esterify the imide, adding a suitable diamine and any desired additives, drying the solution to a powder (reducing any resulting non-powder to a powder) and exposing the powder to microwave energy sufficient to cause the material to expand into a foam and fully cure the foam. As discussed in detail below, the use of the oxoimine appears to be the key to the production of a polyimide resin which can be fully cured by microwave energy, without the complexity and expense of a second thermal heating final cure step.

DETAILED DESCRIPTION OF THE INVENTION

Any suitable aromatic dianhydride may be used in the preparation of the desired imides. Typical aromatic dianhydrides include those described and referenced in the patents listed above. Due to their ready availability at reasonable prices and the excellent foams which result, pyromellitic dianhydride and 3,3', 4,4' benzophenone tetracarboxylic acid dianhydride (BTDA) are preferred.

Any suitable oxoimine may be reacted with the selected dianhydride to produce the desired imides. Preferably, the oxoimine has the general formula:

where "X" is a positive integer from 2 to 4. Of these, best results are obtained with caprolactam.

While any suitable reaction conditions may be used, we have obtained the best results where the dianhydride is added to the oxoimine and the mixture is heated to about 150°–200° C. until imidization is complete, about 5–90 minutes. Optimum results have been obtained at about 180° C. for about 30 minutes.

In order to produce a superior foaming material, we have found that it is essential that the mole ratio of oxoimine to dianhydride be in the range of about 1.5:1 to 0.05:1. Above this range, the material forms a coating without foaming, while below this range excessively rigid material is produced. Within this range optimum results occur with a mole ratio of oxoimine to dianhydride of about 1.0 to 1.0.

The imides produced by the above reaction have the general formula:

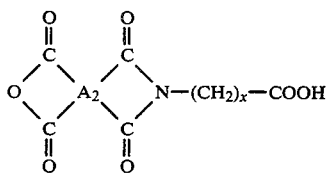

wherein "X" is an integer from 2 to 4 and "A2" is selected from the group consisting of:

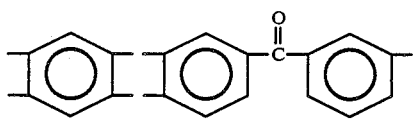

and mixtures thereof.

The imide thus produced is then esterified by dissolving it in a suitable reactive solvent at a suitable temperature. Any suitable reactive solvent which acts as an esterifying agent may be used. Typical of these are aliphatic alcohols having up to 7 carbon atoms and aromatic alcohols, which may have halogen or amino substitutions, and mixures thereof. Best results have been obtained with methyl alcohol. The esterification reaction takes place as follows:

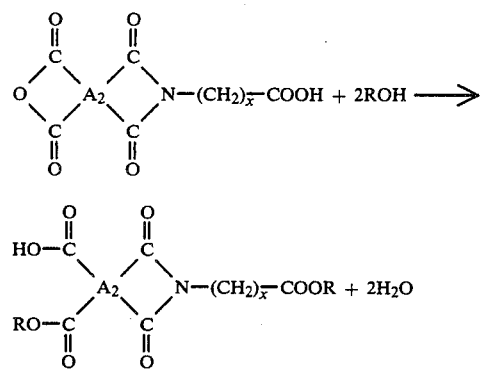

wherein "X" is an integer from 2 to 4, "A2" is as listed for the imide above and "R" is an aliphatic or aromatic radical which may have halogen or amino substitutions. This esterification may take place under any suitable conditions. Typically, a mole ratio of imide to esterifying agent of from about 1:8 to 1:15 is preferred to assure rapid esterification at reflux temperature. This solution is heated to reflux (about 70°–80° C.) until clear, which takes about 60–90 minutes.

Once the esterification is complete, the selected diamine or diamines are added to the solution. Preferably, an approximately stoichiometric quantity of diamine is used.

Any suitable diamine may be used. Typical diamines include meta-phenylene diamine, para-phenylene diamine; 4,4'-diaminodiphenyl ether, 4,4'-diaminodiphenyl sulfone, 3,3'-diaminodiphenyl sulfone, 4,4'-diaminodiphenyl sulfide, 4,4'-diaminodiphenyl methane, 3,3' diaminodiphenyl methane and mixtures thereof. Of these, best results are obtained with 4,4' diaminodiphenyl methane which is, therefore, preferred. If desired, aliphatic diamines may be used in combination with these aromatic diamines. Typical aliphatic diamines include 1, 3-diamino propane, 1,4 diamino butane, 1,6-diamino hexane, 1,8-diamino octaine, 1,12 diamino dodecane and mixtures thereof.

Additives to improve various characteristics of the final foam may be added as desired. Any appropriate additives may be used, such as fillers, surfactants to improve uniformity of the cellular structure, ultraviolet absorbers or the like. Typical surfactants include Dow Corning Corp. 190 or 193, (a silicone surfactant), FC430 from Minnesota Mining & Manufacturing Co., Zonyl FSC from E. I. dePont de Nemours; & Co., BRIJ-78 from ICI Corp, and L550 from Union Carbide Corp. While any suitable concentration may be used, from about 0.01 to 2% (by weight, based on the weight of the solution prior to drying) is preferred. Of these surfactants, best results have been obtained with BRIJ-78. Fillers and reinforcing additives may be added prior to drying the resin. Typical fillers include Kevlar aramid fibers, graphite fibers, glass fibers, carbon and graphite fibers, Teflon fluorocarbon powders and mixtures thereof.

The solution is then dried by any suitable method. Simply heating the solution in an oven to a temperature of about 65°–95° C. until dry is satisfactory. Other conventional methods, such as spray drying, rotary drying, thin film evaporation, etc. may be used as desired. The resulting free-flowing powder or flakes may be further ground or treated as desired and may be stored indefinitely at room temperature. Best results are obtained with spray drying, which quickly and economically both dries the material and directly produces a powder having optimum foaming characteristics.

In accordance with this invention, foaming and curing are simultaneously accomplished by the direct application of microwave energy to the powder. The powder may be placed in any suitable mold which does not interfer with the application of the microwave energy. Typical micro-wave transparent materials are most glasses, ceramics, plastics or the like which do not contain any metal or other microwave absorbing or diverting material. The preferred mold material is polypropylene because it is transparent to microwave energy.

Any suitable microwave application device or oven may be used at any suitable power level. For best results, the powder level in the microwave cavity should be in the of 6 to 90 KW range, with best results for molds having a volume up to about 1.5 m$^3$ occurring at power levels of about 30 KW. The time necessary to achieve optimum foaming and cure depends upon the mold volume, microwave powder level and specific powder composition. Generally, with a mold having a volume of about 1.5 m$^3$ and a powder level of about 30 KW, microwave application should be continued for about 10 min.

The reaction which takes place is quite complex, since it may be a combined condensation and exchange reaction. When the foaming reaction is carried out at higher microwave power levels and/or prolonged heating, a polyimide foam which possesses higher density is formed.

If, however, high microwave energy is avoided, a low density, flexible resilient foam is obtained having the following imideamide structure will remain:

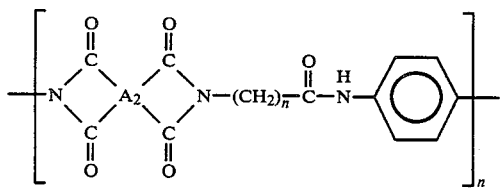

where "X" is an integer from 2 to 4 and "A2" is a radical as listed for the imide above.

As the powder is heated it first melts and, as the condensation reaction begins water and alcohol are released and vaporized, causing the molten mass to expand. The resulting cellular structure becomes self supporting and finally cures to an imide-amide polymer, with proportions of the two polymers depending on heating (time and temperature) conditions. The resulting foam is tough, resilient and will not emit significant smoke or toxic byproducts when exposed to open flame.

Details of the invention will be further understood upon reference to the following examples, which describe preferred embodiments of the methods and compositions of this invention. All parts and percentages are by weight, unless otherwise indicated.

EXAMPLE I

About 322.23 g of 3,3', 4,4', - benzophenonetetracarboxylic acid dianhydride (BTDA) (1 M) and about 22.6 g of caprolactam (0.02 M) are charged into a 5 liter flask and about 500 g of methanol is added. The mixture is refluxed at about 75° C. for about 30 minutes and cooled to about 45° C. About 168.3 g (0 85 M) of 4,4' diamino diphenyl methane is added, followed by about 17.4 g (0.15 M) of 1,6-diamino hexane. The mixture is heated at about 60° C. for about 15 min. and about 8 g of BRIJ 78 surfactant from ICI Corp. is added. The resulting liquid mixture is dried using a high speed atromizer spraying into a chamber preheated at about 75° C. The dried resin is collected and stored at room temperature. About 70 g of the powder is placed in a microwave cavity and a power of about 10 KW is applied. Rapid melting and expansion result in about 3 minutes. After about 7.5 minutes the powder has expanded about 35 times into a polyimide foam which is resilient and flexible indicating that total cure has taken place.

EXAMPLE II

The steps described in Example I are repeated, except that the caprolactam is omitted. The powder is heated by microwave energy as described in Example I for about 7.5 minutes. The powder foams but little or no cure has taken place as evidenced by the brittleness of the foamed mass. Exposure to the microwave energy for an additional 10 minutes improves the cure insignificantly.

EXAMPLE III

A polyimide foam is prepared in the manner described in U.S. Pat. No. 4,305,796. About 322.2 g (1 M) of BTDA and about 500 g of methanol are charged into a 5 liter flask and refluxed for about 30 minutes at about 80° C. The mixture is cooled to about 45° C. About 32.7 g (0.3 M) of 2.6-diamino pyridine and about 138.7 g (0.7 M) 4,4'-diamino diphenyl methane are added and the mixture is heated at about 65° C. for about 5 minutes. About 8 g Arlasolve 200, a surfactant from ICI Corp., is added and the liquid resin is spray dried into a chamber maintained at about 70° C. About 70 g of the resulting powder is placed in a microwave cavity at a power of about 10 KW for about 7.5 minutes. The powder expands into a polyimide foam which is friable and cannot be handled without immediately pulverizing. The time in the microwave cavity at 10 KW is extended to 45 minutes. The foam still is not cured and is very friable.

EXAMPLE IV

The experiment of Example III is repeated in its entirety, with one change; the addition of about 45.3 g (0.4 M) caprolactam to the BTDA just prior to the addition of the methanol. The foam cures in about 10 minutes and is resilient, possessing a very open cellular structure.

EXAMPLE V

A foamable polyimide powder is prepared in the manner taught by U.S. Pat. No. 4,346,182. About 322.2 g (1 M) of BTDA is mixed with about 240 ml of methanol and heated to reflux in a 2 liter flask and refluxed for about 30 minutes, then cooled to about 30° C. 2,6 diamins pyridine 32.8 g (0.3 M), and 4,4' diaminodiphenyl methane 99.1 g (0.5 M) were added followed by 23.2 g (0.2 M) of 1,6-diamino hexane is added to the mixture which is then heated at about 65° C. for about 5 minutes. Then about 4.8 g of Arlasolve 200 surfactant is added and the liquid resin is spray dried at about 75° C. producing a free flowing powder. About 70 g of this powder is placed in a microwave oven at a power of about 15 KW for about 10 minutes. The powder foams, but is friable and breaks when touched. Extending the microwave time to 45 minutes does not significantly change the foam characteristics.

EXAMPLE VI

The experiment of Example V is repeated, with the only change the addition of about 10.9 g (0.1 M) caprolactam to the BTDA just before mixing with the methanol. The powder foams rapidly, producing a resilient, flexible foam indicating that complete cure occurs during the 15 minutes of microwave heating.

EXAMPLE VII

About 120.8 g (0.375 M) of 3,3', 4,4'-benzophenonetetracarboxylic acid dianhydride (BTDA) and about 28.29 g (0.25 M) caprolactam are placed in a one liter flask and heated to about 175° C. After about 30 minutes at this temperature the mixture is cooled to about 50° C. and about 100 g of ethanol is added. This mixture is heated to reflux temperature (about 75° C.). Reflux is continued until the mixture appears clear, about 70 minutes. The mixture is cooled to just below about 70° C. and about 73.3 g. (0.37 M), 4,4'-diaminodiphenyl methane and 0.58 g (0.005 M) of 1,6 diaminohexane is added. This mixture is refluxed (at about 75° C.) for about 15 minutes, then is cooled to room temperature and dried in a spray dryer. The powder is placed in a microwave oven at 10 KW. After about 7 minutes of heating at about 10 KW, the material is found to have expanded into a flexible, resilient foam sheet having a homogenous cellular structure. When exposed to an open flame, the foam produces no visible smoke.

EXAMPLE VIII

The procedure of Example VII is repeated four additional times, varying only the quantity of caprolactam used. Where Example VII used about 28.29 g (0.25 M) of caprolactam to give a molar ratio of caprolactam of BDTA of about 0.66:1, the four additional experiments use caprolactam quantities of about; VII(a) 43.4 g (0.375 M, 1:1 ratio), VII(b) 53 g (0.468 M, 1.25:1 ratio), VII(c) 63.6 g (0.5625 M, 1.5:1 ratio) and VII(d) 84.8 g (0.75 M, 2:1 ratio). The foam produced in experiments VII(a) and VII(b) have excellent foam rise characteristics, while that produced in VII(c) has low foam rise and VII(d) does not foam. This demonstrates that ratios of oxoimine to dianhydride in the 0.05:1 to 1.5:1 ratios are necessary for the production of good quality foam.

EXAMPLE IX

The procedures of Example VII are repeated, except that in place of ethanol, the following solvents are used: IX(a) isopropyl alcohol, IX(b) aminoethyl alcohol, IX(c) benzene, IX(d) dimethyl acetamide and IX(e) zcetone. In each case IX(a) and IX(b) where a reactive solvent is used to esterify the imide, an excellent foam results. Where an inert solvent is used, IX(c) through IX(e), foaming does not take place.

EXAMPLE X

The procedures of Example VII are repeated, except that the following diamines are used in place of the 4,4'-diaminodiphenyl methane: X(a) m-phenylene diamine (0.375 M), X(b) 4,4'-diaminodiphenyl sulfone (0.375 M), and X(c) 4,4'-diaminodiphenyl oxide (0.375 M). In each case the resulting foam has a uniform cellular structure and has excellent heat and flame resistance. The flexibility and resiliency varies somewhat among the sub-examples.

EXAMPLE XI

The procedures of Example VII are repeated with the only change being the substitution of the following oxoimines for the 0.25 M caprolactam specified in Example VII: XI(a) 2-pyrrolidone (0.25 M), XI(b) 2-piperidone (0.25 M), XI(c) caprolactam (0.125 M) and 2-piperidone (0.125 M). The product in each case is an excellent, flame resistant foam, with slight changes in physical properties with the different oxoimines.

EXAMPLE XII

The procedures of Example VII are repeated, except that the microwave heating conditions are varied as follows: XI(a) 1 KW for 5 minutes, XI(b), 5 KW for 5 minutes, XI(c), 15 KW for 5 minutes, XI(d) 30 KW for 5 minutes, XI(e) 10 KW for 1 minute, XI(f) 10 KW for 10 minutes, XI(g) 10 KW for 60 minutes. Results are as follows: XI(a) no cure, XI(b) fair cure, XI(c) good cure, XI(d) good cure, XI(e) no cure, XI(f) good cure, XI(g) good cure. Best results are obtained at about 10 KW and 10 minutes, with the foam having the following characteristics: flexible, resilient and light in color.

EXAMPLE XIII

About 322 g. (1 M) 3,3', 4,4'-benzophenonetetracarboxylic acid dianhydride and about 226 g. (2 M) caprolactam are added to a 5 liter flask and heated at about 170° C. for about 30 minutes. The mixture is cooled to about 70° C., then about 800 g. of methanol is added. After the esterification reaction product is fully dissolved, an additional about 644 g. (2 M) of 3,3',4,4'-benzophenonetetracarboxylic acid dianhydride is added. The material is refluxed until clear and then is cooled to about 45° C. About 297 g. (1.5 M) 4,4'-diaminodiphenyl methane and about 192 g. (0.96 M) 4,4'-diaminodiphenyl oxide are added stirred at about 50° C. until dissolved. About 64 g. (0.54 M) 1,6-diamine hexane is dissolved in about 100 g. of methanol and added to the mixture while maintaining the mixture at a temperature below about 55° C. The mixture is then heated to about 65° C. and held there for about 10 minutes. About 17 g. of Dow Corning 193, a silicone surfactant, is added to the mixture, which is stirred while cooling to room temperature. The resulting liquid mixture is dried using a high speed atomizer spraying into a chamber preheated to about 75° C. The dried resin is collected and stored at room temperature. A layer of the powder is placed in a microwave oven at about 6 KW for about 25 minutes.

The powder is observed to first melt, then expand into a very flexible and resilient foam sheet with very uniform cell structure.

Although specific components, proportions and conditions have been specified in the above examples, these may be varied with similar results, where suitable. In addition, other materials may be added to the foamable material, such as fillers, colorants, ultraviolet absorbers, or the like.

Other applications, modifications and ramifications of the present invention will occur to those skilled in the art upon reading the present disclosure. These are intended to be included within the scope of the invention, as defined in the appended claims.

We claim:

1. The method of making a resilient, flame resistant modified polyimide foam which comprises the steps of:
reacting an aromatic dianhydride with an oximine having the general formula:

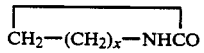

wherein "X" is an integer from 2 to 4, in a mole ratio of oxoimine to dianhydride between about 1.5:1 and about 0.05:1 to produce an N-substituted aliphatic imide;
dissolving said imide in a reactive solvent esterifying agent to esterify said imide;
adding thereto a diamine;
drying the resulting solution; and
exposing the dried material to microwave energy at a level of from about 5 to 80 KW for from 5 to 60 minutes to cause said material to spontaneously foam and cure,
whereby a resilient foam having good flame resistance is produced.

2. The method according to claim 1 wherein said drying is accomplished by spray drying to produce a substantially uniform powder.

3. The method according to claim 1 wherein said microwave energy is applied for about 10 minutes at about 10 KW (optimum).

4. The method according to claim 1 wherein said aromatic dianhydride is pyromellitic dianhydride, 3, 3', 4,4'-benzophenone tetracarboxylic acid dianhydride or mixtures thereof.

5. The method according to claim 1 wherein said oxoimine is caprolactam.

6. The method according to claim 1 wherein said reactive solvent is methyl alcohol.

7. The method according to claim 1 wherein said diamine is 4,4'-diaminophenyl methane.

8. The method according to claim 1 wherein said diamine comprises at least two different diamines, at least one of which is an aromatic diamine.

9. The method according to claim 1 further including the step of adding from about 0.01 to about 2 wt. % of a surfactant to the solution prior to drying.

10. The method according to claim 1 further including the step of adding fillers or reinforcing materials to the solution prior to drying.

11. The method of making a resilient, flame resistant modified polyimide foam which comprises the steps of:
reacting an aromatic dianhydride with an oximine having the general formula:

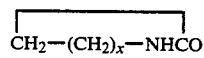

wherein "X" is an integer from 2 to 4, in a mole ratio of oxoimine to dianhydride between about 1.5:1 and about 0.05:1 to produce an N-substituted aliphatic imide;
dissolving said imide in reactive solvent esterifying agent to exterify said imide;
adding thereto a diamine;
adding thereto an effective quantity of a surfactant,
spray drying the mixture to produce a dry, free-flowing powder;
placing said powder in a microwave oven;
subjecting said powder solely to microwave energy for a period sufficient to produce a fully cured, resilient and flexible foam.

12. The method according to claim 11 wherein said aromatic dianhydride is pyromellitic dianhydride, 3,3', 4,4'-benzophenone tetracarboxylic acid dianhydride or mixtures thereof.

13. The method according to claim 11 wherein said oxoimine is caprolactam.

14. The method according to claim 11 wherein said reactive solvent is methyl alcohol.

15. The method according to claim 11 wherein said diamine is 4,4'-diaminophenyl methane.

16. The method according to claim 11 wherein said diamine comprises at least two different diamines, at least one of which is an aromatic diamine.

17. In the method of making a resilient, flame resistant modified polyimide foam which comprises the steps of:
reacting an aromatic dianhydride with an oximine having the general formula:

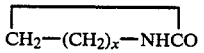

where "X" is an integer from 2 to 4, to produce an N-substituted aliphatic imide;
dissolving said imide in a reactive solvent esterifying agent to esterify said imide;
adding thereto a diamine;
drying the resulting solution; and heating the dry material to foam and cure the material; the improvement wherein:

said solution is dried by spray drying said solution to produce a free flowing dry powder; and said dry material is heated to foam and cure solely by exposing said dry powder to microwave energy for a period sufficient to produce a fully cured, resilient foam.

18. The improvement according to claim 17 wherein an effective quantity of a surfactant is mixed with said solution prior to spray drying said solution.

19. The improvement according to claim 17 wherein said dry powder is exposed to microwave energy for from about 7 to 10 minutes at an energy level of about 8 to 10 KW.

20. The improvement according to claim 17 wherein said aromatic dianhydride is 3,3', 4,4' - benzophenonetetracarboxylic acid dianhydride and said oxoimine is caprolactam.

* * * * *